United States Patent Office 2,965,651
Patented Dec. 20, 1960

2,965,651

EPISULFIDE COMPOUNDS

Milton Kosmin, Dayton, Ohio, assignor to Monsanto Chemical Company, St. Louis, Mo., a corporation of Delaware No Drawing. Filed Sept. 20, 1957, Ser. No. 685,072

7 Claims. (Cl. 260—327)

This invention relates to novel episulfide compounds which are particularly useful in stabilizing vinyl halide polymers. More specifically this invention relates to novel aryloxy-propene-1,2-sulfides.

Vinyl halide polymers may be utilized for many useful applications in industry due to their wide range of physical properties and their high resistance to oxidation, organic solvents, acids, and alkalies. These polymers find application for example in the production of coating compositions, fibers, films, and in the production of shaped articles by various molding techniques. The industrial use of these polymers is, however, considerably restricted by their tendency to decompose in the presence of heat and light with the liberation of acidic decomposition products. As a result of this decomposition, the polymers become discolored and in many instances lose many of their more desirable physical properties.

It has been proposed to stabilize vinyl halide polymers against this type of decomposition by the addition thereto of various organic and inorganic compounds, but the stabilizing effect of such compounds has not been entirely satisfactory. Many of the suggested compounds have shown some activity in stabilizing the polymers against decomposition by heat, but have shown little or no effect in stabilizing the same polymers against decomposition caused by exposure to light, especially light that is rich in ultraviolet radiation.

I have now found a new and useful class of episulfide compounds which are, inter alia, particularly effective in increasing the resistance of vinyl halide polymers to decomposition by light. This novel class of compounds comprises aryloxypropene-1,2-sulfides having the formula

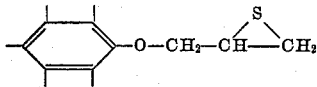

and preferably having the formula

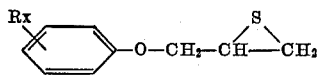

wherein R is selected from the group consisting of chlorine atoms and alkyl radicals containing up to 20 carbon atoms, and x is an integer from 0 to 5. However, it is preferred that when R is an alkyl radical and x is greater than 1 that the sum of the carbon atoms of the alkyl radicals does not exceed 20. Furthermore, as hereinafter more fully exemplified, the alkyl radicals can be similar or different.

Epoxide compounds have been previously utilized as stabilizers for polyvinyl halide composition, but the present episulfide stabilizers are markedly more effective than the corresponding epoxide compounds.

One method of preparing the aryloxypropene-1,2-sulfides is by the reaction of the corresponding epoxide compounds with a thiocyanate compound, as for example sodium thiocyanate or potassium thiocyanate in a manner analogous to that fully disclosed in the manipulative example shown below.

Typical episulfide compounds of the present invention which can be prepared according to this procedure are, for example, 3-phenoxypropene-1,2-sulfide, 3-(2,4,6-trimethylphenoxy)-propene - 1,2 - sulfide, 3-(p-tertiary-butylphenoxy)propene-1,2,-sulfide, 3-(2,4 - dimethyl-6-tertiary-butylphenoxy)propene-1,2-sulfide, ortho-, meta-, and paratolyloxypropene-1,2-sulfides, 3-(p-cetyl-phenoxy) propene-1,2 - sulfide, 3-pentachlorophenoxypropene-1,2-sulfide, 3-(dinonylphenoxy)propene-1,2-sulfide, 3-(2-chlorophenoxy)-propene-1,2 - sulfide, 3-(2 - chloro-3-methylphenoxy)propene-1,2 - sulfide, 3-(3-ethylphenoxy) propene-1,2 - sulfide, 3-pentamethylphenoxy-propene-1,2-sulfide, and the like.

The polymeric material to be stabilized by the novel compounds of the present invention can be any of the homopolymers of the vinyl halides, i.e., halogen-substituted ethenoid monomers such as vinyl chloride and vinylidene chloride, and any copolymers containing predominant quantities, e.g., at least 70 percent by weight, of the said vinyl halides. The materials to be copolymerized with the vinyl halides are the polymerizable organic compounds containing at least one olefinic carbon pair ($>C=C<$) in the molecule, such as in vinyl acetate, diethyl fumarate, methyl methacrylonitrile, acrylonitrile, styrene, ethylene, butadiene, allyl alcohol, diallyl ether, divinyl succinate, diallyl phthalate, vinyl benzoate, allyl acetate, diallyl adipate, and the like, and mixtures thereof.

While the present episulfide compounds can be successfully utilized as the sole stabilizing agent in vinyl halide polymers, these episulfide stabilizers can also be utilized very advantageously in combination with other well-known vinyl halide stabilizers, for example, diallyl maleate, cadmium or strontium naphthenates, bisphenols, diphenyl thiourea, tri-(2-alkenyl)-phosphites such as triallyl phosphite, etc. A particularly effective stabilizer combination is one containing the present episulfide compounds along with fatty acid soaps of Group II metals, such as strontium, barium, or cadmium stearates or laurates, or combinations thereof.

The proportion of stabilizer used in the present compositions will generally run between about 0.1 weight percent and about 10 weight percent, and preferably between about 0.5 weight percent and about 5 weight percent of stabilizer, based upon the total weight of composition stabilized.

Other substances which can be, and often will be, incorporated into the compositions of the present invention include substances such as solvents, e.g., hydrocarbons and/or ketones; pigments, e.g., lampblack, titanium dioxide or lead chromate; plasticizers, e.g., dibutyl phthalate, tricresyl phosphate or dioctyl phathalate, etc.

The following is an example of the preparation of one of the episulfides of the present invention.

*Example*

3-phenoxypropene-1,2-sulfide was prepared by dissolving 60.5 grams of potassium thiocyanate in a mixture 50 ml. of water and 37.5 ml. of 95 percent ethanol, and adding thereto 37.5 grams of 3-phenoxypropene-1,2-oxide. The liquid was stirred for 4 hours at room temperature, after which an additional 37.5 grams of 3-phenoxypropene-1,2-oxide was added. The stirring was then continued for 5 days at room temperature. At this time there was a solid precipitate at the bottom and an oily layer at the top of the liquid mixture. The oily layer was removed and dissolved in about 100 cc. of ether. The ether solution was thoroughly washed with saturated sodium chloride solution and dried. The ether was then evaporated from the product and the product was distilled to give 3-phenoxypropene-1,2-sulfide having a boiling point of 94°–95°/4 mm.; $n_D^{25}=1.5742$; analysis: sulfur, calculated 19.2 percent, found 18.8 percent.

The limited class of substituted aryloxypropene-1,2-sulfides disclosed above can be prepared in a similar manner to that described in the above example, i.e. by the reaction of potassium thiocyanate with a substituted 3-aryloxy-1,2-epoxypropane corresponding to the desired sulfide.

This application is a continuation-in-part of my copending application Serial Number 412,945, filed February 26, 1954, now U.S. Patent No. 2,824,845, issued February 25, 1958.

I claim:
1. A compound having the formula

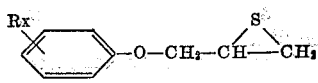

wherein R is selected from the group consisting of chlorine and alkyl radicals of 1 to 20 carbon atoms, $x$ is an integer from 0 to 5, and the sum of the carbon atoms of the alkyl radicals does not exceed 20.

2. A compound having the formula

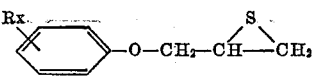

wherein R is an alkyl radical of 1 to 20 carbon atoms, $x$ is an integer from 0 to 5, and the sum of the carbon atoms of the alkyl radicals does not exceed 20.

3. The compound 3-phenoxypropene-1,2-sulfide.
4. The compound 3-(p-tolyloxy)propene-1,2-sulfide.
5. The compound 3-(2,4,6-trimethylphenoxy)propene-1,2-sulfide.
6. The compound 3-(p-tertiary-butylphenoxy)propene-1,2-sulfide.
7. The compound 3-pentachlorophenoxypropene-1,2-sulfide.

References Cited in the file of this patent
UNITED STATES PATENTS 2,166,604     Meyer _____ July 18, 1939

OTHER REFERENCES

Richter: Organic Chemistry, vol. 3, pp. 5 and 6 (1923 edition), P. Blakiston's Son and Co., Philadelphia, Pa.

Eugene E. Van Tamelen, J. Am. Chem. Soc., vol. 73, pp. 3444–3448, July 1951.